US010773569B2

(12) United States Patent
Masuda et al.

(10) Patent No.: US 10,773,569 B2
(45) Date of Patent: Sep. 15, 2020

(54) COOLING APPARATUS FOR VEHICLE

(71) Applicant: SUBARU CORPORATION, Tokyo (JP)

(72) Inventors: Yo Masuda, Tokyo (JP); Takuya Takashima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 127 days.

(21) Appl. No.: 15/631,524

(22) Filed: Jun. 23, 2017

(65) Prior Publication Data

US 2018/0072135 A1    Mar. 15, 2018

(30) Foreign Application Priority Data

Sep. 9, 2016    (JP) .................................. 2016-176327

(51) Int. Cl.
*B60H 1/32*    (2006.01)
*H01M 10/625*    (2014.01)
(Continued)

(52) U.S. Cl.
CPC ............ *B60H 1/32* (2013.01); *B60H 1/00457* (2013.01); *B60H 1/00885* (2013.01); *B60H 1/06* (2013.01); *B60L 1/003* (2013.01); *B60L 1/02* (2013.01); *B60L 58/24* (2019.02); *B60L 58/26* (2019.02); *H01M 10/42* (2013.01); *H01M 10/486* (2013.01); *H01M 10/488* (2013.01); *H01M 10/60* (2015.04); *H01M 10/613* (2015.04); *H01M 10/625* (2015.04); *H01M 10/635* (2015.04); *H01M 10/6568* (2015.04);

(Continued)

(58) Field of Classification Search
CPC ...... B60H 1/32; H01M 10/60; H01M 10/613; H01M 10/625; H01M 10/635
USPC ........................................................ 123/41.1
See application file for complete search history.

(56) References Cited

U.S. PATENT DOCUMENTS

2013/0014911 A1*    1/2013    Lee ...................... B60W 20/00
165/51

FOREIGN PATENT DOCUMENTS

JP         2006-336626 A       12/2006
JP         2008215183 A  *      9/2008
(Continued)

*Primary Examiner* — Lindsay M Low
*Assistant Examiner* — Omar Morales
(74) *Attorney, Agent, or Firm* — Smith, Gambrell & Russell, LLP

(57) ABSTRACT

A cooling apparatus for vehicle includes a radiator, a coolant pump, a cooling fan, first and second mode controllers, and an abnormality diagnosing controller. The radiator cools a coolant that circulates through a circulation flow channel of a cooling system. The coolant pump causes the coolant to circulate through the circulation flow channel. The cooling fan faces the radiator. The first mode controller initiates a first operation mode process upon diagnosing an abnormality of the cooling system. The first operation mode process stops the coolant pump and drives the cooling fan. The second mode controller initiates a second operation mode process after completion of the first operation mode process. The second operation mode process stops the cooling fan and drives the coolant pump. The abnormality diagnosing controller diagnoses, based on a temperature of the radiator, the abnormality of the cooling system after the initiation of the second operation mode process.

20 Claims, 8 Drawing Sheets

(51) Int. Cl.
  *H01M 10/48*    (2006.01)
  *H01M 10/42*    (2006.01)
  *B60L 1/02*     (2006.01)
  *H01M 10/613*   (2014.01)
  *H01M 10/60*    (2014.01)
  *H01M 10/635*   (2014.01)
  *H01M 10/6568*  (2014.01)
  *B60L 58/26*    (2019.01)
  *B60L 1/00*     (2006.01)
  *B60L 58/24*    (2019.01)
  *B60H 1/00*     (2006.01)
  *B60H 1/06*     (2006.01)

(52) U.S. Cl.
  CPC ..... *B60L 2240/36* (2013.01); *B60L 2240/545* (2013.01); *B60L 2240/662* (2013.01); *Y02T 10/705* (2013.01); *Y02T 10/7005* (2013.01); *Y02T 10/7291* (2013.01); *Y02T 90/16* (2013.01)

(56) References Cited

FOREIGN PATENT DOCUMENTS

| | | |
|---|---|---|
| JP | 2010-65671 A | 3/2010 |
| JP | 2011-172406 A | 9/2011 |
| JP | 2015-59458 A | 3/2015 |

* cited by examiner

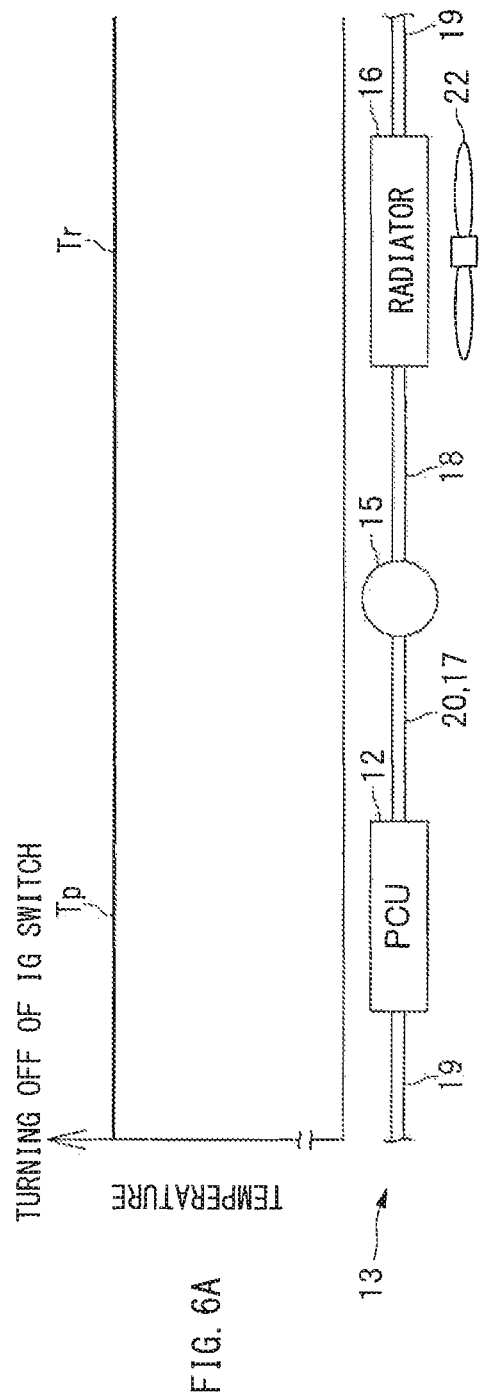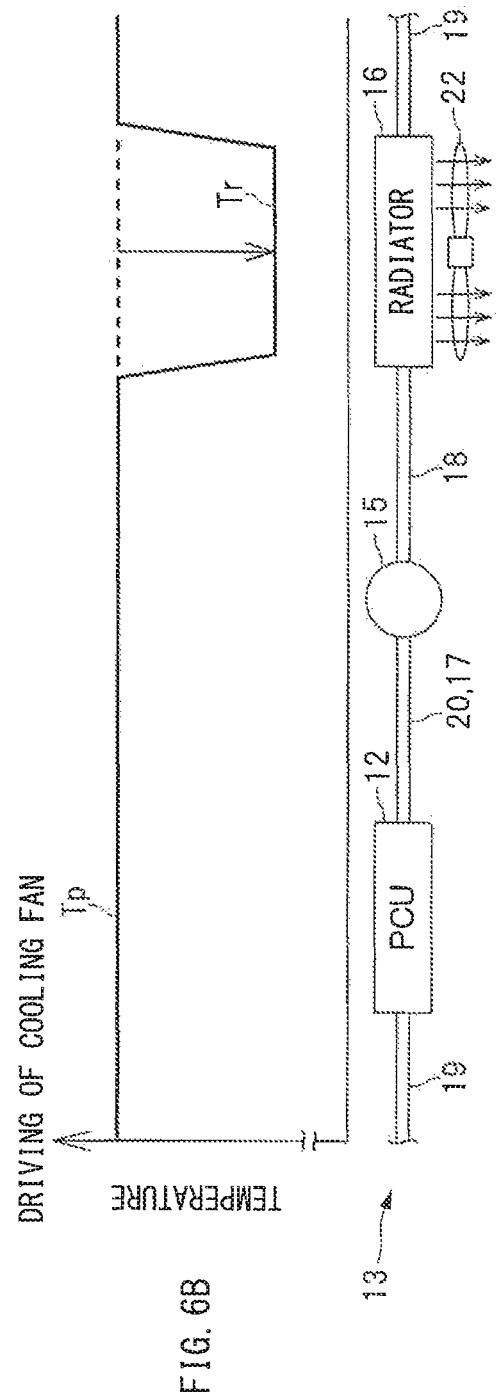

COOLING APPARATUS FOR VEHICLE

CROSS-REFERENCE TO RELATED APPLICATIONS

The present application claims priority from Japanese Patent Application No. 2016-176327 filed on Sep. 9, 2016, the entire contents of which are hereby incorporated by reference.

BACKGROUND

The technology relates to a cooling apparatus for a vehicle that cools a heat-generating component.

A vehicle including an automobile is mounted with a heat-generating component such as an engine, a motor-generator, an inverter, and a converter. In order to cool the heat-generating component to a temperature within a predetermined temperature range, the vehicle is provided with a cooling system that cools the heat-generating component by circulating a coolant. To detect an abnormality of the cooling system that circulates the coolant, such as an abnormality of a water pump that delivers the coolant with pressure, a device has been proposed that diagnoses the presence of the abnormality on the basis of a temperature of the circulating coolant. For example, reference is made to Japanese Unexamined Patent Application Publication Nos. 2006-336626, 2010-65671, 2011-172406, and 2015-59458.

SUMMARY

A device that diagnoses the presence of an abnormality of a cooling system, such as that described above, diagnoses the abnormality of the cooling system during traveling of a vehicle. Diagnosing the abnormality of the cooling system during the traveling of the vehicle, however, involves a difficulty in increasing an accuracy of the abnormality diagnosis of the cooling system, in that factors including a state of heat generation of a heat-generating component and a state of cooling of a radiator vary by the minute.

It is desirable to provide a cooling apparatus for vehicle that is able to increase an accuracy of an abnormality diagnosis of a cooling system.

An aspect of the technology provides a cooling apparatus for vehicle. The apparatus includes a cooling system configured to cool a heat-generating component. The apparatus includes: a radiator that is provided in a circulation flow channel of the cooling system, and configured to cool a coolant that circulates through the circulation flow channel; a coolant pump that is provided in the circulation flow channel, and configured to cause the coolant to circulate through the circulation flow channel; a cooling fan that faces the radiator, and configured to generate cooling air; a first mode controller configured to initiate a first operation mode process upon diagnosing an abnormality of the cooling system, in which the first operation mode process stops the coolant pump and drives the cooling fan; a second mode controller configured to initiate a second operation mode process after completion of the first operation mode process, in which the second operation mode process stops the cooling fan and drives the coolant pump; and an abnormality diagnosing controller configured to diagnose, on a basis of a temperature of the radiator, the abnormality of the cooling system after the initiation of the second operation mode process.

An aspect of the technology provides a cooling apparatus for vehicle. The apparatus includes a cooling system configured to cool a heat-generating component. The apparatus includes: a radiator that is provided in a circulation flow channel of the cooling system, and configured to cool a coolant that circulates through the circulation flow channel; a coolant pump that is provided in the circulation flow channel, and configured to cause the coolant to circulate through the circulation flow channel; a cooling fan that faces the radiator, and is configured to generate cooling air; and circuitry configured to initiate a first operation mode process upon diagnosing an abnormality of the cooling system, in which the first operation mode process stops the coolant pump and drives the cooling fan, initiate a second operation mode process after completion of the first operation mode process, in which the second operation mode process stops the cooling fan and drives the coolant pump, and diagnose, on a basis of a temperature of the radiator, the abnormality of the cooling system after the initiation of the second operation mode process.

BRIEF DESCRIPTION OF THE DRAWINGS

FIG. 6A briefly illustrates an example of a temperature distribution of a cooling system.

FIG. 6B briefly illustrates an example of the temperature distribution of the cooling system, FIG. 7A briefly illustrates an example of the temperature distribution of the cooling system, FIG. 7B briefly illustrates an example of the temperature distribution of the cooling system.

DETAILED DESCRIPTION

Figure 1:
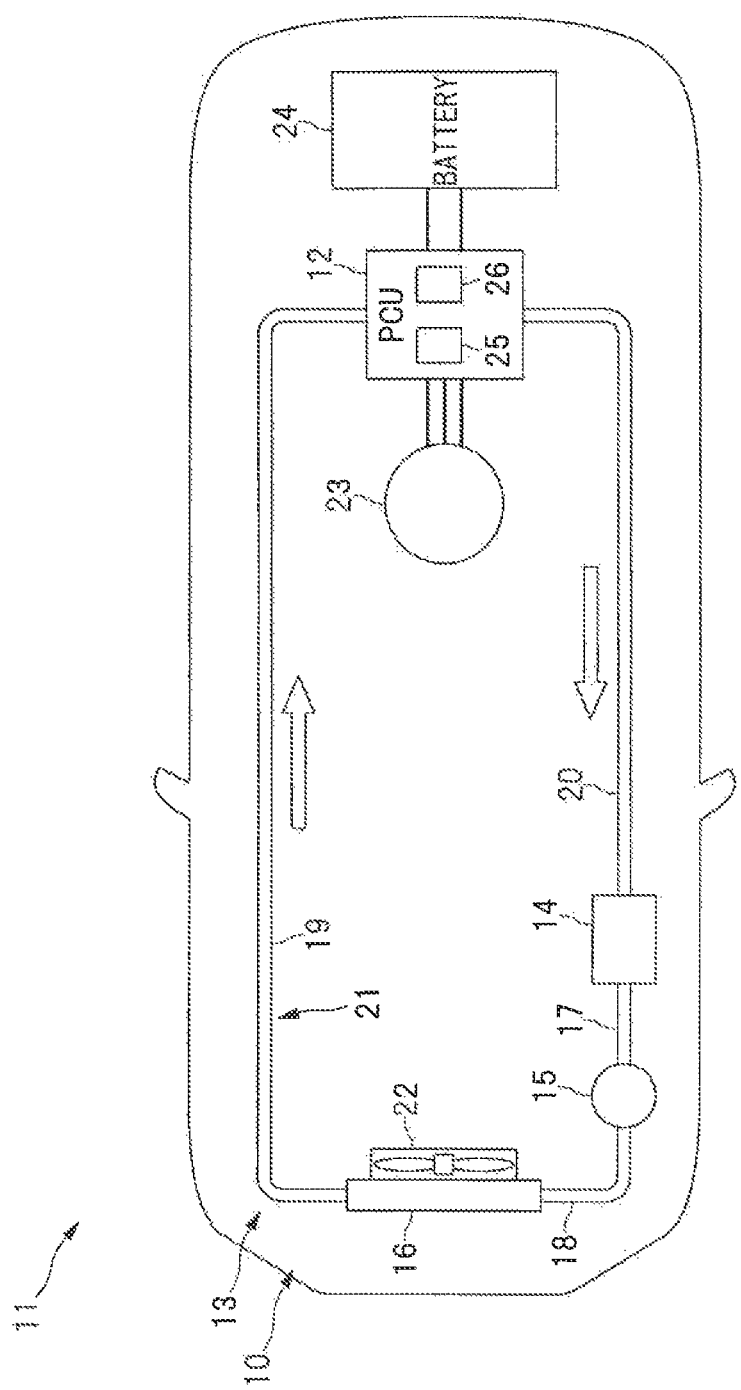
FIG. 1 schematically illustrates an example of a configuration of a cooling apparatus for vehicle according to an implementation of the technology.

In the following, a description is given in detail of one implementation of the technology with reference to the accompanying drawings. FIG. 1 schematically illustrates a configuration of a cooling apparatus for vehicle 10 as a cooling apparatus for vehicle according to an implementation of the technology, in which an outline arrow denotes a direction of flow of a coolant.

Referring to FIG. 1, the cooling apparatus for vehicle 10 may be mounted on a vehicle 11 such as a hybrid vehicle. The cooling apparatus for vehicle 10 includes a cooling system 13 that cools a power control unit (hereinafter referred to as "PCU") 12. The cooling system 13 may include a reservoir tank 14 that retains the coolant, a water pump 15 that delivers the coolant with pressure, a radiator 16 that cools the coolant, and the PCU 12. In one implementation, the water pump 15 may serve as a "coolant pump". The PCU 12 serves as a "heat-generating component" in the present implementation. The reservoir tank 14, the water pump 15, the radiator 16, and the PCU 12 may be coupled in series to one another through pipe lines 17 to 20. In other words, the cooling system 13 may have a circulation flow channel 21 formed by the reservoir tank 14, the water pump 15, the radiator 16, the PCU 12, and the pipe lines 17 to 20.

The water pump 15 may be driven to suck the coolant from the reservoir tank 14 to the water pump 15 and feed the coolant from the water pump 15 to the radiator 16. The coolant having been cooled by traveling through the radiator 16 may be fed to the PCU 12 (i.e., to an unillustrated water jacket of the PCU 12) to cool the PCU 12, following which the coolant may be fed again to the reservoir tank 14. Thus, driving the water pump 15 allows the coolant to circulate along the circulation flow channel 21 and thereby allows for cooling of the PCU 12. The cooling system 13 may also include a cooling fan 22 that faces the radiator 16 and generates cooling air. Driving the cooling fan 22 allows the cooling air to be supplied to the radiator 16. The water pump 15 may be an electric pump driven by an unillustrated electric motor, and the cooling fan 22 may be an electric fan driven by an unillustrated electric motor.

The PCU 12 may electrically couple a motor-generator 23 and a battery 24 together, and may have built-in power conversion devices such as an inverter 25 and a converter 26. Upon a power-running operation of the motor-generator 23, a DC (direct current) current outputted from the battery 24 may be boosted by the converter 26, following which the boosted DC current may be converted into an AC (alternating current) current by the inverter 25. Thus, the DC current outputted from the battery 24 may be converted into the boosted AC current by the converter 26 and the inverter 25, and the boosted AC current may be supplied to the motor-generator 23. Upon a regenerative operation of the motor-generator 23, an AC current outputted from the motor-generator 23 may be converted into a DC current by the inverter 25, following which the converted DC current say be stepped down by the converter 26. Thus, the AC current outputted from the motor-generator 23 may be converted into the stepped-down DC current by the inverter 25 and the converter 26, and the stepped-down DC current may be supplied to the battery 24.

[Control System]

Figure 2:
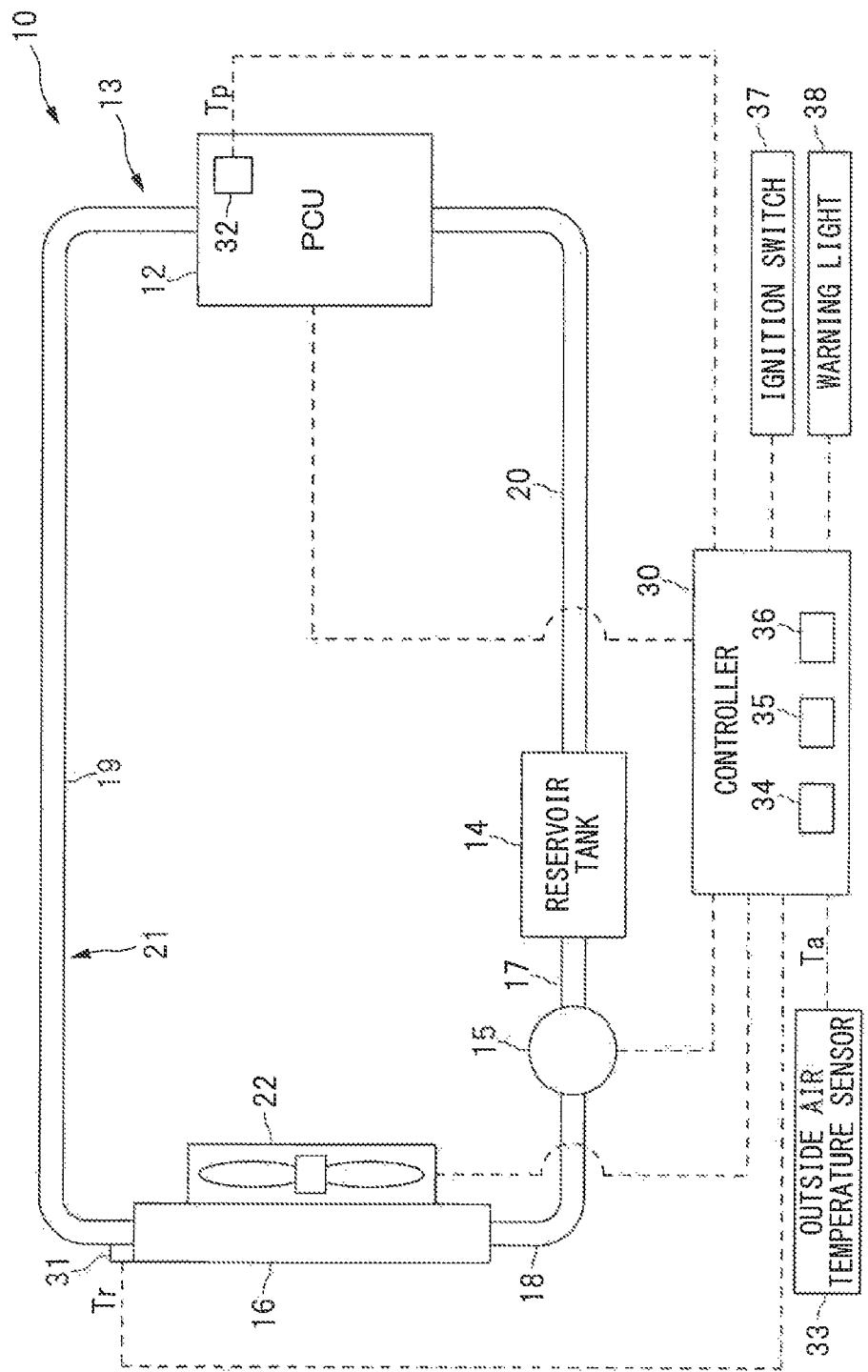
FIG. 2 schematically illustrates an example of a configuration of a control system provided in the cooling apparatus for vehicle illustrated in FIG. 1.

A description is now given of a control system of the cooling apparatus for vehicle 10. FIG. 2 schematically illustrates an example of a configuration of the control system provided in the cooling apparatus for vehicle 10. Referring to FIG. 2, the cooling apparatus for vehicle 10 includes a controller 30 that controls the cooling system 13. The controller 30 may include a device such as a microcomputer. The controller 30 may be coupled to sensors such as a radiator temperature sensor 31 that detects a temperature of the radiator 16 (hereinafter referred to as a radiator temperature Tr), a PCU temperature sensor 32 that detects a temperature of the PCU 12 (hereinafter referred to as a PCU temperature Tp), and an outside air temperature sensor 33 that detects a temperature of outside air (hereinafter referred to as an outside air temperature Ta).

The controller 30 may control a rotation speed of each of the water pump 15 and the cooling fan 22 on the basis of factors such as the radiator temperature Tr and the PCU temperature Tp to thereby control the PCU temperature Tp such that the PCU temperature Tp falls into a predetermined temperature range. For example, the controller 30 may increase the rotation speed of the water pump 15, the rotation speed of the cooling fan 22, or both in a case where the radiator temperature Tr, the PCU temperature Tp, or both is high, and may decrease the rotation speed of the water pump IS, the rotation speed of the cooling fan 22, or both in a case where the radiator temperature Tr, the PCU temperature Tp, or both is low. The controller 30 may limit an output of the PCU 12 to suppress an amount of heat generation of the PCU 12 in a case where the decrease in the PCU temperature Tp is insufficient even when the rotation speed of each of the water pump 15 and the cooling fan 22 is increased.

The controller 30 also has a function of diagnosing an abnormality of the cooling system 13. In the present implementation, the abnormality of the cooling system 13 may be diagnosed after the stop of the vehicle 11 resulting from turning off of an ignition switch 37. In other words, the controller 30 has the function of diagnosing the abnormality of the cooling system 13 during soaking in which the PCU 12 stops together with a control system of the vehicle 11. To diagnose the abnormality, the controller 30 includes a first mode controller 34 that performs a first operation mode process, a second mode controller 35 that performs a second operation mode process, and an abnormality diagnosing controller 36 that diagnoses the abnormality of the cooling system 13. The controller 30 may also be coupled to the ignition switch 37 and a warning light 38. The ignition switch 37 may be operated by an occupant upon start-up of the vehicle 11 or upon the stop of the vehicle 11. In one implementation, the ignition switch 37 may serve as a "start-up switch". The warning light 38 may be lighted upon an occurrence of the abnormality of the cooling system 13. It is to be noted that the controller 30 is kept activated until the abnormality diagnosis of the cooling system 13 is completed even when the ignition switch 37 is turned off.

[Abnormality Diagnosing Control]

Figure 3:
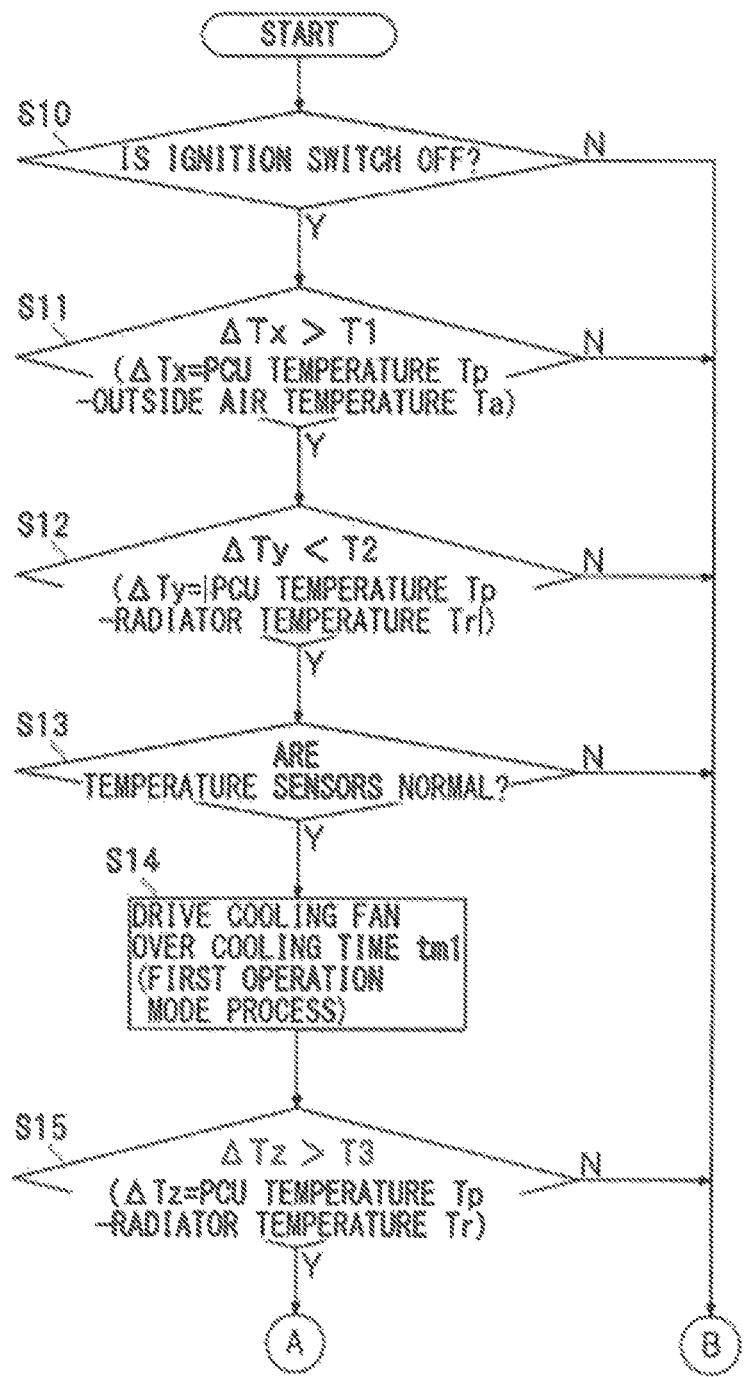
FIG. 3 is a flowchart illustrating an example of a procedure of carrying out an abnormality diagnosing control.
Figure 4:
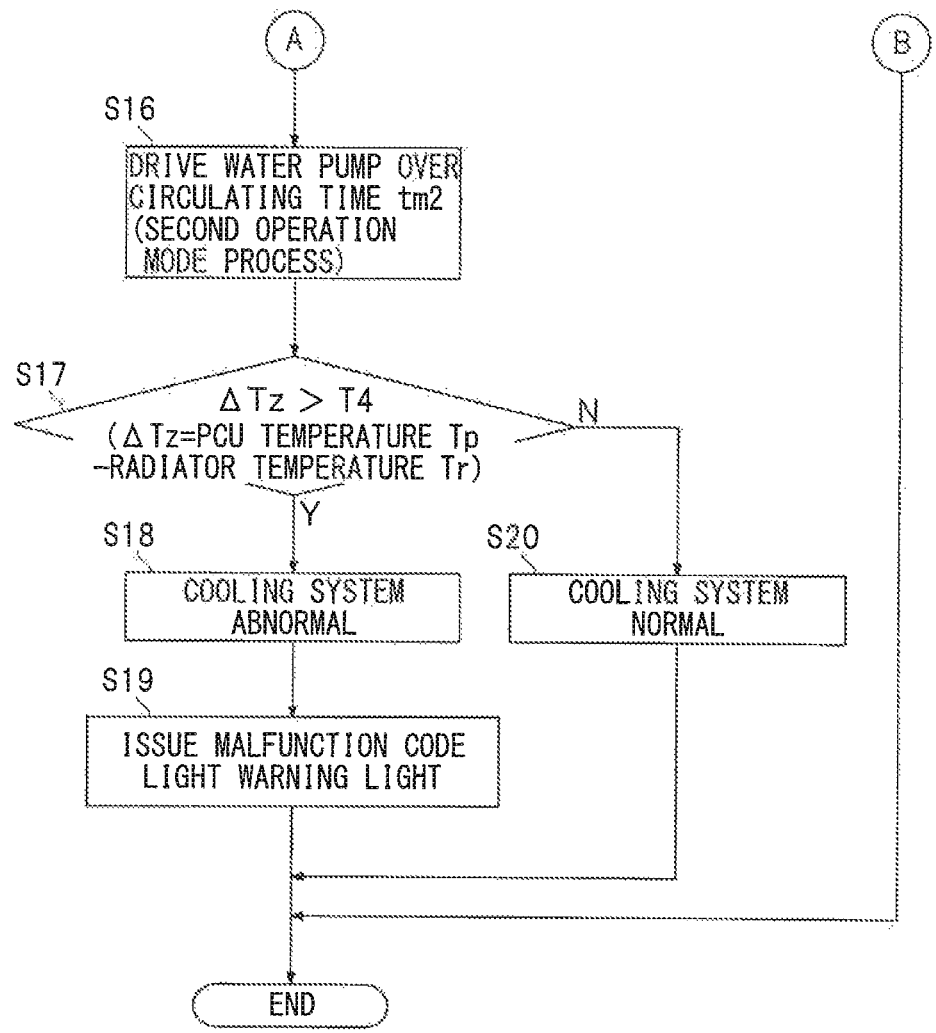
FIG. 4 is a flowchart illustrating an example of a procedure of carrying out the abnormality diagnosing control following the procedure illustrated in FIG. 3.
Figure 5:
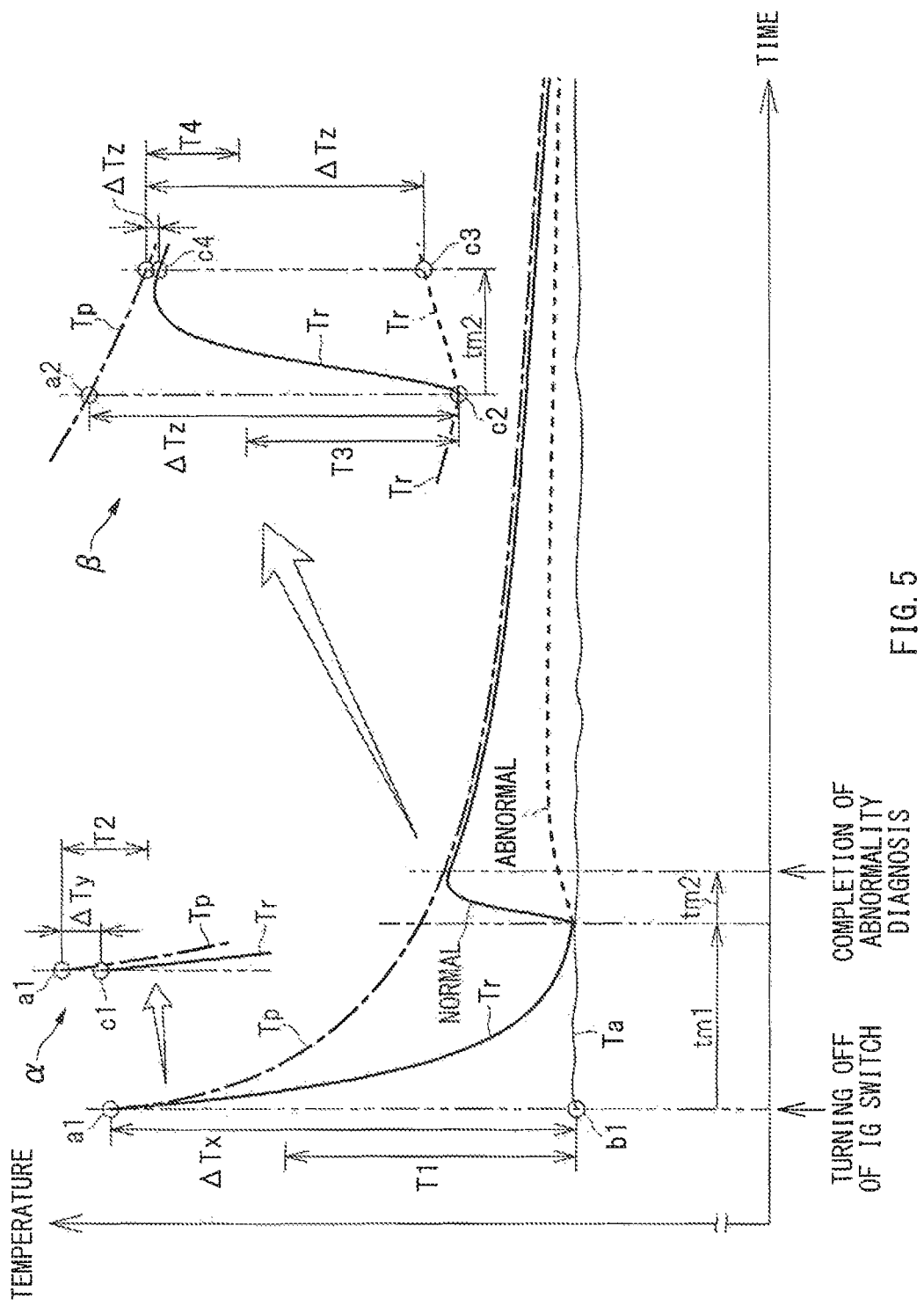
FIG. 5 is a diagram illustrating an example of a transition of each of a radiator temperature, a PCU temperature, and an outside air temperature upon the abnormality diagnosing control.

A description is given now of an abnormality diagnosing control that diagnoses the abnormality of the cooling system 13. FIGS. 3 and 4 are each a flowchart illustrating an example of a procedure of carrying out the abnormality diagnosing control. Note that the procedures illustrated in FIGS. 3 and 4 are coupled to each other at parts denoted by reference signs A and B. FIG. 5 is a diagram illustrating an example of a transition of each of the radiator temperature Tr, the PCU temperature Tp, and the outside air temperature Ta upon the abnormality diagnosing control. The term "IG switch" illustrated in FIGS. 3 and 5 denotes the ignition switch 37.

Referring to FIG. 3, a determination may be made in step S10 as to whether the ignition switch 37 is turned off The routine may be terminated without performing the abnormality diagnosis of the cooling system 13 when the determination is made in step S10 that the ignition switch 37 is not turned off, i.e., the ignition switch 37 is kept turned on (step S10: N). When the determination is made in step S10 that the ignition switch 37 is turned off (step S10: Y), the flow may proceed to step S11 to initiate the abnormality diagnosis of the cooling system 13. Note that the water pump 15 and the cooling fan 22 each may be so controlled as to be in a stopped state in a case where the ignition switch 37 is turned off.

In step S11, a determination may be made as to whether a temperature difference $\Delta Tx$ between the PCU temperature Tp and the outside air temperature Ta is greater than a predetermined threshold T1. In one implementation, the threshold T1 may serve as a "first threshold". When the determination is made in step S11 that the temperature difference $\Delta Tx$ is greater than the threshold T1 (step S11: Y), the flow may proceed to step S12. In step S12, a determination may be made as to whether a temperature difference $\Delta Ty$ between the PCU temperature Tp and the radiator temperature Tr is less than a predetermined threshold T2. In one implementation, the threshold T2 may serve as a "second threshold". When the determination is made in step S12 that the temperature difference $\Delta Ty$ is less than the threshold T2 (step S12: Y), the flow may proceed to step S13. In step S13, a determination may be made as to whether all of the radiator temperature sensor 31, the PCU temperature sensor 32, and the outside air temperature sensor 33 are normal, on the basis of a malfunction code stored in the controller 30.

A situation in which the temperature difference $\Delta Tx$ is determined as being greater than the threshold T1 in step S11 is where the PCU temperature Tp is sufficiently higher than the outside air temperature Ta as denoted by reference signs a1 and b1 in FIG. 5. A situation in which the temperature difference $\Delta Ty$ is determined as being less than the threshold T2 in step S12 is where the PCU temperature Tp and the radiator temperature Tr are close to each other as denoted by reference signs a1 and c1 in an enlarged part β of FIG. 5.

In a case where the PCU temperature Tp is sufficiently higher than the outside air temperature Ta and the PCU temperature Tp and the radiator temperature Tr are close to each other at the time when the ignition switch 37 is turned off, it is possible to perform the abnormality diagnosis of the cooling system 13 in accordance with a procedure to be described later. Hence, the flow may proceed to step S14 on a condition that, at the time when the ignition switch 37 is turned off, the PCU temperature Tp is sufficiently higher than the outside air temperature Ta and the PCU temperature Tp and the radiator temperature Tr are close to each other. In contrast, the routine may be terminated without performing the abnormality diagnosis of the cooling system 13 when the determination is made in step S11 that the temperature difference $\Delta Tx$ is equal to or less than the threshold T1 (step S11: N), when the determination is made in step S12 that the temperature difference $\Delta Ty$ is equal to or greater than the threshold T2 (step S12: N), or when the determination is made in step S13 that any of the temperature sensors, e.g., the radiator temperature sensor 31, the PCU temperature sensor 32, and the outside air temperature sensor 33, involves malfunction (step S13: N).

Thereafter, in step S14, the cooling fan 22 may be driven over a predetermined cooling time tm1 while maintaining the stopped state of the water pump 15. In other words, the first operation mode process is performed in step S14 in which the water pump 15 is stopped and the cooling fan 22 is driven. The flow may proceed to step S15 following the driving of the cooling fan 22 over the cooling time tm1. In step S15, a determination may be made as to whether a temperature difference $\Delta Tz$ between the PCU temperature Tp and the radiator temperature Tr is greater than a predetermined threshold T3. In one implementation, the threshold T3 may serve as a "third threshold". The routine may be terminated without performing the abnormality diagnosis of the cooling system 13 when the determination is made in step S15 that the temperature difference $\Delta Tz$ is equal to or less than the threshold T3 (step S15: N).

Referring to FIG. 4, the flow may proceed to step S16 when the determination is made in step S15 that the temperature difference $\Delta Tz$ is greater than the threshold T3 (step S15: Y). in step S16, the water pump 15 may be driven over a predetermined circulating time tm2 while maintaining the stopped state of the cooling fan 22. In other words, the second operation mode process is performed in step S16 in which the cooling fan is stopped and the water pump 15 is driven. The flow may proceed to step S17 following the driving of the water pump 15 over the circulating time tm2. In step S17, a determination may be made as to whether the temperature difference $\Delta Tz$ between the PCU temperature Tp and the radiator temperature Tr is greater than a predetermined threshold T4. In one implementation, the threshold T4 may serve as a "diagnosis threshold".

When the determination is made in step S17 that the temperature difference $\Delta Tz$ is greater than the threshold T4 (step S17: Y), the flow may proceed to step S18 in which the cooling system 13 is determined as being abnormal. The flow may thereafter proceed to step S19 in which a malfunction code is issued and the warning light 38 is lighted. The malfunction code may represent that the cooling system 13 is abnormal. The warning light 38 may indicate that the cooling system 13 is abnormal. In contrast, when the determination is made in step S17 that the temperature difference $\Delta Tz$ is equal to or less than the threshold T4 (step S17: N), the flow may proceed to step S20 in which the cooling system 13 is determined as being normal.

A situation in which the temperature difference $\Delta Tz$ is determined as being greater than the threshold T3 in step S15 is where the radiator temperature Tr has decreased greatly as compared with the PCU temperature Tp as denoted by reference signs a2 and c2 in an enlarged part α of FIG. 5, as a result of performing the first operation mode process. In other words, performing the first operation mode process makes it possible to greatly decrease only the radiator temperature Tr by supplying the cooling air to the radiator 16 while stopping the circulation of the coolant, owing to the stopping of the water pump 15 and the driving of the cooling fan 22 performed in the first operation mode process.

A situation in which the temperature difference $\Delta Tz$ is determined as being greater than the threshold T4 in step S17, i.e., in which the cooling system 13 is determined as being abnormal, is where the temperature difference $\Delta Tz$ between the radiator temperature Tr of the radiator 16 and the PCU temperature Tp of the PCU 12 has not been solved despite a fact that the coolant is circulated after the radiator temperature Tr is decreased greatly and solely. In other words, the situation is where the recovery of the radiator temperature Tr is difficult as denoted by a reference sign c3 in the enlarged part β of FIG. 5 despite having circulated the coolant by driving the water pump 15. Hence, the cooling system 13 in this case is determined by the controller 30 as being abnormal on assumption that the coolant possibly flows at an insufficient flow rate due to clogging, freezing, or any other factor of the circulation flow channel 21.

In contrast, a situation in which the temperature difference $\Delta Tz$ is determined as being equal to or less than the threshold T4 in step S17, i.e., in which the cooling system 13 is determined as being normal, is where the temperature difference $\Delta Tz$ between the radiator temperature Tr of the radiator 16 and the PCU temperature Tp of the PCU 12 has been solved as a result of circulating the coolant after the radiator temperature Tr is decreased greatly and solely. In other words, the situation is where the radiator temperature Tr has recovered as denoted by a reference sign c4 in the enlarged part β of FIG. 5 owing to the circulation of the coolant by driving the water pump 15. Hence, the cooling system 13 in this case is determined by the controller 30 as being normal on assumption that the coolant is possibly circulated at a sufficient flow rate.

[Temperature Distribution of Cooling System]

Figure 7A:
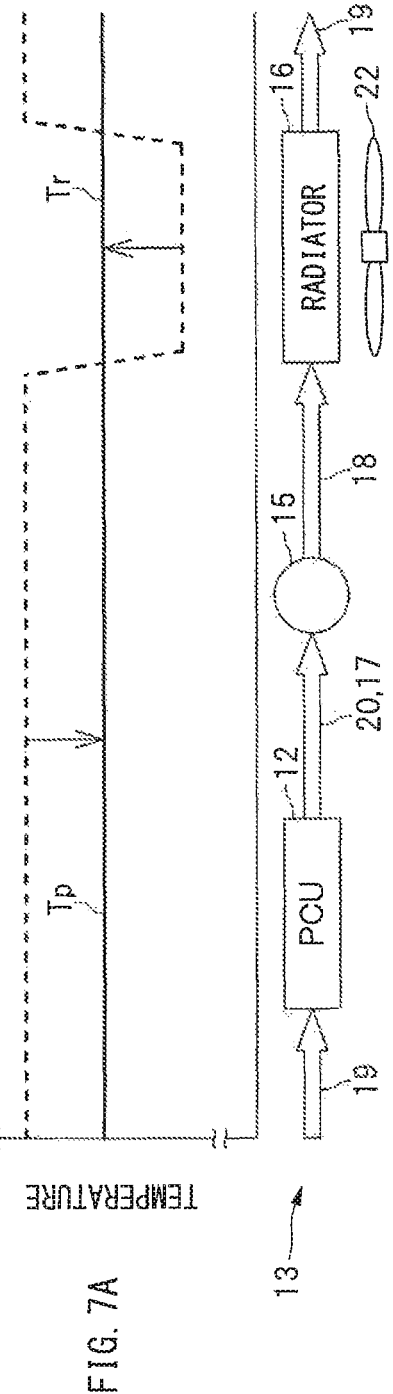
Figure 7B:
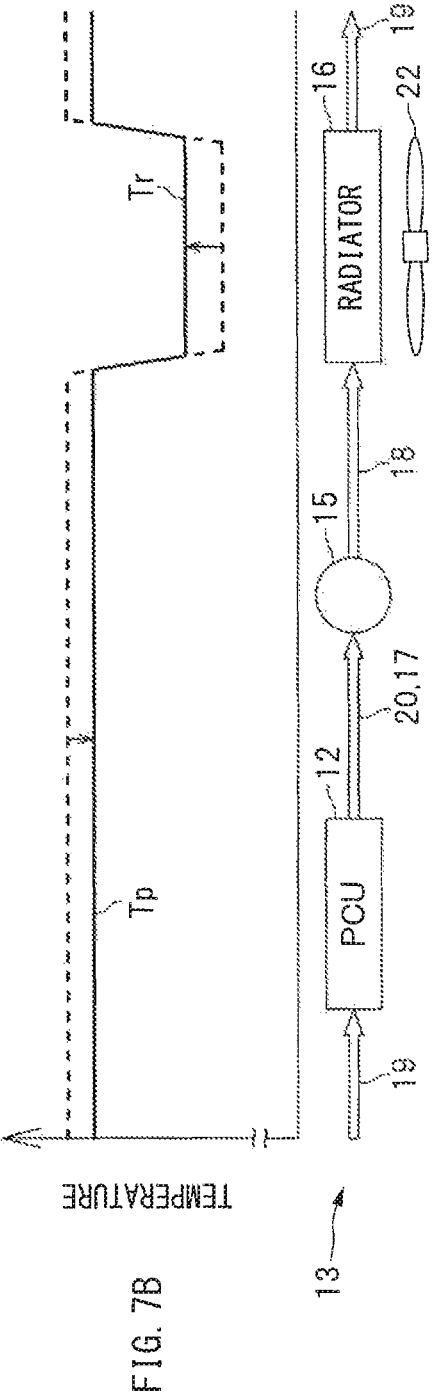

A description is now given of a change in temperature distribution of the cooling system 13 as a result of performing the foregoing abnormality diagnosing control. FIGS. 6A to 7B each briefly illustrate an example of the temperature distribution of the cooling system 13. FIG. 6A illustrates the temperature distribution when the ignition switch 37 is turned off. FIG. 6B illustrates the temperature distribution following the driving of the cooling fan 22 in accordance with the first operation mode process. FIGS. 7A and 7B each illustrate the temperature distribution following the driving of the water pump 15 in accordance with the second operation mode process.

Referring to FIG. 6A, when the ignition switch 37 is turned off, the temperature distribution of the cooling system 13 is substantially uniform owing to the circulating coolant. One reason is that the water pump 15 is driven until immediately prior to the turning off of the ignition switch 37. In other words, the PCU temperature Tp and the radiator temperature Tr are substantially the same as each other at a timing in which the abnormality diagnosing control is initiated. Referring to FIG. 6B, the first operation mode process is performed thereafter in which the water pump 15 is stopped and the cooling fan 22 is driven. When the first operation mode process is performed, the radiator temperature Tr decreases greatly as compared with the PCU temperature Tp. One reason is that the radiator 16 is cooled in a state in which the circulation of the coolant is stopped in the first operation mode process.

Referring to FIGS. 7A and 7B, the second operation mode process is performed thereafter in which the cooling fan 22 is stopped and the water pump 15 is driven. When the second operation mode process is performed, the temperature distribution of the cooling system 13 becomes uniform again as the circulation of the coolant progresses. One reason is that the coolant circulates by the driving of the water pump 15 in the second operation mode process. The coolant circulates at a sufficient flow rate in a situation where the PCU temperature Tp and the radiator temperature Tr become substantially equal to each other as a result of a decrease in the PCU temperature Tp and an increase in the radiator temperature Tr as illustrated in FIG. 7A. Hence, the cooling system 13 is determined as being normal when the PCI) temperature Tp and the radiator temperature Tr become substantially equal to each other following the decrease in the PCU temperature Tp and the increase in the radiator temperature Tr. In contrast, the coolant circulates at an insufficient flow rate in a situation where the decrease in the PCU temperature Tp, the increase in the radiator temperature Tr, or both is small and thus the PCU temperature Tp and the radiator temperature Tr are away from each other as illustrated in FIG. 7B. Hence, the cooling system 13 is determined as being abnormal when the decrease in the PCU temperature Tp, the increase in the radiator temperature Tr, or both is small and thus the PCU temperature Tp and the radiator temperature Tr are away from each other.

As described in the foregoing, the controller 30 initiates the first operation mode process when diagnosing the abnormality of the cooling system 13. The first operation mode process stops the water pump 15 and drives the cooling fan 22. The controller 30 initiates the second operation mode process after the completion of the first operation mode process. The second operation mode process stops the cooling fan 22 and drives the water pump 15. Further, the controller 30 diagnoses the presence of the abnormality of the cooling system 13 on the basis of the temperature difference $\Delta Tz$ between the radiator temperature Tr and the PCU temperature Tp.

The water pump 15 and the cooling fan 22 are controlled in accordance with the first and the second operation mode processes, making it possible to perform the abnormality diagnosis of the cooling system 13 after the vehicle 11 is stopped, i.e., after the ignition switch 37 is turned off. Hence, it is possible to increase an accuracy of the abnormality diagnosis of the cooling system 13. More specifically, diagnosing the abnormality of the cooling system 13 during traveling of the vehicle 11 involves a difficulty in increasing the accuracy of the abnormality diagnosis of the cooling system 13, in that factors including a state of heat generation of the heat-generating component such as the PCU 12 and a state of cooling of the radiator 16 vary constantly. However, the water pump 15 and the cooling fan 22 are controlled in accordance with the first and the second operation mode processes, making it possible to overcome such a difficulty.

Further, the abnormality diagnosis of the cooling system 13 is performed during the stop of the vehicle 11, making it possible to complete the abnormality diagnosis of the cooling system 13 in preparation for the next traveling of the vehicle 11. This means that it is possible to notify the occupant of the abnormality before the traveling of the vehicle 11 in a case where the cooling system 13 involves the abnormality such as clogging, and thereby to improve reliability of the vehicle 11. In addition, the presence of the abnormality is diagnosed on the basis of a temperature of the cooling system 13, making it possible to perform the abnormality diagnosis by means of an extremely simple configuration and thereby to suppress a cost of the cooling apparatus for vehicle 10.

In one implementation described above, the abnormality of the cooling system 13 is diagnosed on the basis of the temperature difference $\Delta Tz$ between the radiator temperature Tr and the PCU temperature Tp. The abnormality diagnosis, however, is not limited thereto. In an alternative implementation, the abnormality of the cooling system 13 may be diagnosed on the basis of the radiator temperature Tr. For example, referring to FIG. 2, the radiator temperature Tr increases greatly upon the execution of the second operation mode process when the cooling system 13 is normal, whereas the radiator temperature Tr increases a little upon the execution of the second operation mode process when the cooling system 13 is abnormal. The alternative implementation may thus diagnose the presence of the abnormality of the cooling system 13 on the basis of a factor of the radiator temperature Tr, such as a range of increase in the radiator temperature Tr and a rate of increase in the radiator temperature Tr. Further, in one implementation described above, the presence of the abnormality of the cooling system 13 is diagnosed at a timing in which the second operation mode process is completed. The abnormality diagnosis, however, is not limited thereto. In an alternative implementation, the abnormality of the cooling system 13 may be diagnosed before the second operation mode process is completed as long as the abnormality of the cooling system 13 is diagnosed after the initiation of the second operation mode process. In a yet alternative implementation, the abnormality of the cooling system 13 may be diagnosed after the second operation mode process is completed.

It is to be noted that FIG. 1 illustrates an example in which the radiator 16 is mounted at a front part of the vehicle 11 and the PCU 12 is mounted at a rear part of the vehicle 11. Separating the positions at which the PCU 12 and the radiator 16 are disposed in this way makes it easier to widen the temperature difference between the PCU temperature Tp and the radiator temperature Tr upon the first operation mode process. The position of each of the PCU 12 and the radiator 16, however, is not limited thereto. In an alternative implementation, the PCU 12 and the radiator 16 may be so mounted as to be located close to each other. For example, both the PCU 12 and the radiator 16 may be mounted at a front part of the vehicle 11, or both the PCU 12 and the radiator 16 may be mounted at a rear part of the vehicle 11. Further, in one implementation described above, the first operation mode process is brought to the completion on the basis of the elapse of the cooling time tm1, and the second operation mode process is brought to the completion on the basis of the elapse of the circulating time tm2. The timing of the completion of each of the first and the second operation mode processes, however, is not limited thereto. In an alternative implementation, the first operation mode process may be brought to the completion when the temperature difference ΔTz is greater than a predetermined value, and the second operation mode process may be brought to the completion when the temperature difference ΔTz is less than the predetermined value.

[Other Implementations]

Figure 8:
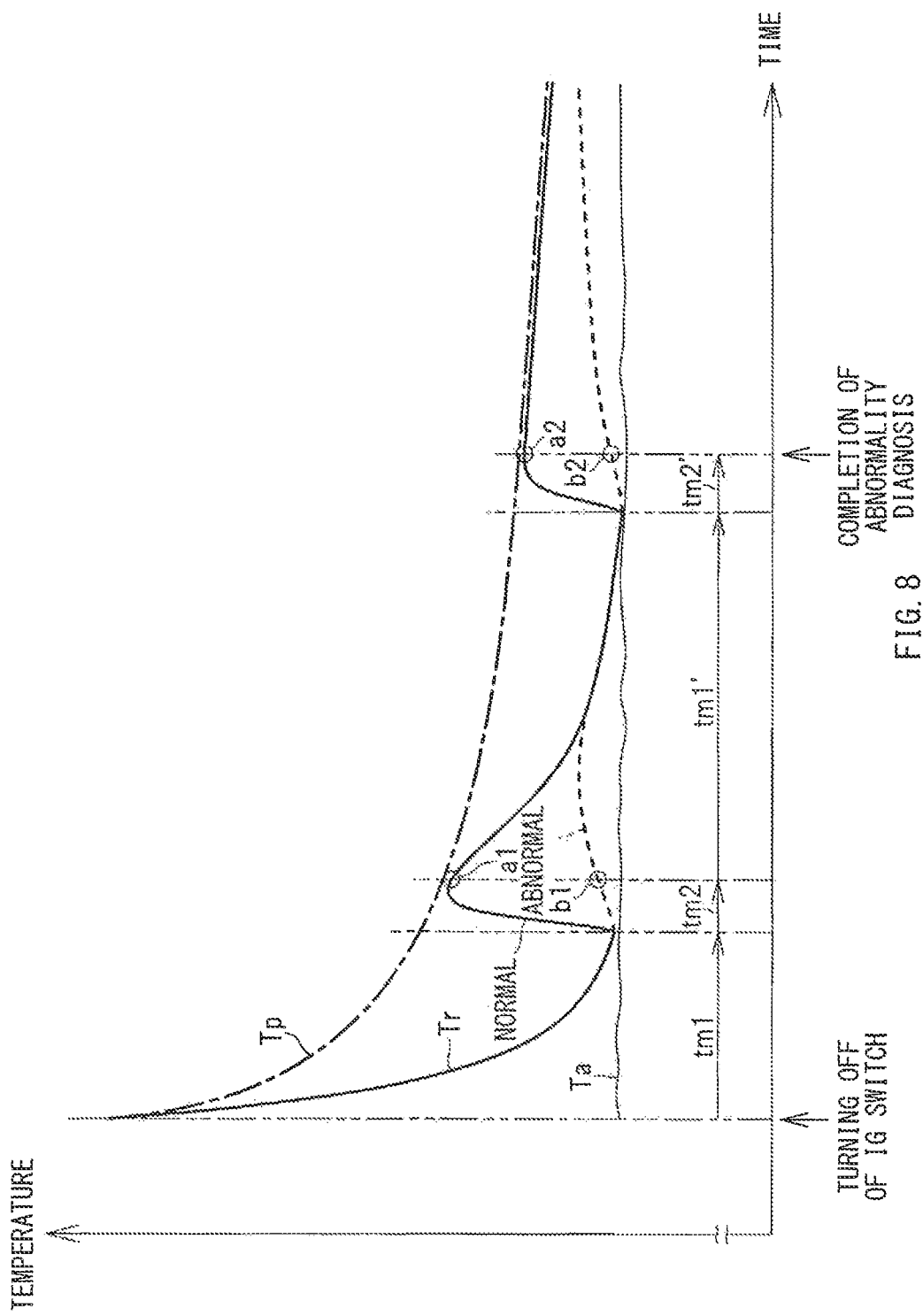
FIG. 8 is a diagram illustrating an example of the transition of each of the radiator temperature, the PCU temperature, and the outside air temperature upon the abnormality diagnosing control.

In one implementation described above, the abnormality of the cooling system 13 is diagnosed on the basis of the first operation mode process and the second operation mode process each performed once. The number of the first and the second operation mode processes, however, is not limited thereto. In an alternative implementation, the abnormality of the cooling system 13 may be diagnosed on the basis of the first operation mode process and the second operation mode process each performed a plurality of times. FIG. 8 is a diagram illustrating an example of a transition of each of the radiator temperature Tr, the PCU temperature Tp, and the outside air temperature Ta upon the abnormality diagnosing control. In the abnormality diagnosing control illustrated in FIG. 8, the abnormality of the cooling system 13 is diagnosed on the basis of the first operation mode process and the second operation mode process each performed twice.

Referring to FIG. 8, when the ignition switch 37 is turned off, the first operation mode process may be performed in which the water pump 15 is stopped and the cooling fan 22 is driven. When the first operation mode process is performed over the predetermined cooling time tm1, the second operation mode process may be performed in which the cooling fan 22 is stopped and the water pump 15 is driven. After the second operation mode process is performed over the predetermined circulating time tm2, the presence of the abnormality of the cooling system 13 may be determined on the basis of the temperature difference between the PCU temperature Tp and the radiator temperature Tr. The cooling system 13 may be determined as being normal in a case where the radiator temperature Tr has come sufficiently close to the PCU temperature Tp as denoted by the reference sign a1 in FIG. 8, whereas the cooling system 13 may be determined as being abnormal in a case where the radiator temperature Tr has gone away from the PCU temperature Tp as denoted by the reference sign b1 in FIG. 8.

When the initial second operation mode process is completed, the first operation mode process may be performed again in which the water pump 15 is stopped and the cooling fan 22 is driven. When the first operation mode process is performed over a predetermined cooling time tm1', the second operation mode process may be performed in which the cooling fan 22 is stopped and the water pump 15 is driven. After the second operation mode process is performed over a predetermined circulating time tm2', the presence of the abnormality of the cooling system 13 may be determined on the basis of the temperature difference between the PCU temperature Tp and the radiator temperature Tr. The cooling system 13 may be determined as being normal in a case where the radiator temperature Tr has come sufficiently close to the PCU temperature Tp as denoted by the reference sign a2 in FIG. 8, whereas the cooling system 13 may be determined as being abnormal in a case where the radiator temperature Tr has gone away from the PCU temperature Tp as denoted by the reference sign b2 in FIG. 8.

According to this implementation, the abnormality diagnosis of the cooling system 13 is performed repeatedly. Hence, it is possible to further improve reliability of the abnormality diagnosis. In this implementation, the cooling time tm1 and the cooling time tm1' in the first operation mode process may be set to values that are the same as each other, and the circulating time tm2 and the circulating time tm2' in the second operation mode process may be set to values that are the same as each other. The cooling time in each of the first and the second operation mode processes, however, is not limited thereto. In an alternative implementation, the cooling time tm1 and the cooling time tm1' in the first operation mode process may be set to values that are different from each other, and the circulating time tm2 and the circulating time tm2' in the second operation mode process may be set to values that are different from each other.

The cooling apparatus for vehicle 10 according to any of the foregoing implementations initiates the first operation mode process when diagnosing the abnormality of the cooling system 13. The first operation mode process stops the water pump 15 and drives the cooling fan 22. The cooling apparatus for vehicle 10 initiates the second operation mode process after the completion of the first operation mode process. The second operation mode process stops the cooling fan 22 and drives the water pump 15. Further, the cooling apparatus for vehicle 10 diagnoses the abnormality of the cooling system 13 after the initiation of the second operation mode process, on the basis of the temperature of the radiator 16. Hence, it is possible to increase the accuracy of the abnormality diagnosis of the cooling system 13.

Although some preferred implementations of the technology have been described in the foregoing by way of example with reference to the accompanying drawings, the technology is by no means limited to the implementations described above, and is variously modifiable without departing from the scope as defined by the appended claims. For example, the cooling apparatus for vehicle 10 is applied to the vehicle 11 as the hybrid vehicle in any of the foregoing implementations. The vehicle 11 to which the cooling apparatus for vehicle 10 is applied, however, is not limited thereto. The cooling apparatus for vehicle 10 may be applied to any vehicle 11 as long as the vehicle 11 includes the cooling system 13 that cools any heat-generating component. In addition, the PCU 12 is given as an example of the heat-generating component in any of the foregoing implementations. The heat-generating component, however, is not limited thereto. Non-limiting examples of the heat-generating component may also include an engine and an electric motor. Further, one heat-generating component is provided for the cooling system 13 in an illustrated implementation. The number of heat-generating components provided for the cooling system 13, however, is not limited thereto. In an alternative implementation, a plurality of heat-generating components may be provided for one cooling system 13.

The radiator temperature Tr may be a temperature of the radiator 16 itself, or may be a temperature of the coolant that flows through the radiator 16. The PCU temperature Tp may be a temperature of a housing of the PCU 12 itself, or may be a temperature of an element in one or more of the power conversion devices provided inside the PCU 12. Non-limiting examples of the power conversion device may include the inverter 25, the converter 26, and a reactor. The PCU temperature Tp may alternatively be a temperature of the coolant that flows in the PCU 12. The outside air temperature Ta may be a temperature of the outside air to be blown onto the radiator 16, e.g., may be a temperature of air inside an engine room into which the outside air is to be introduced. In an illustrated implementation, the cooling fan 22 that faces the radiator 16 is a suction fan. A type of the cooling fan 22, however, is not limited thereto. In an alternative implementation, the cooling fan 22 may be a forcing fan. Further, the coolant is caused to flow from the water pump 15 to the PCU 12 through the radiator 16 in any of the foregoing implementations. The flow of the coolant, however, is not limited thereto. In an alternative implementation, the coolant may flow from the water pump 15 to the radiator 16 through the PCU 12.

The controller 30 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the controller 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 30 illustrated in FIG. 2.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A cooling apparatus for a vehicle, the apparatus including a cooling system configured to cool a heat-generating component, the apparatus comprising:
    a radiator that is provided in a circulation flow channel of the cooling system, and configured to cool a coolant that circulates through the circulation flow channel;
    a coolant pump that is provided in the circulation flow channel, and configured to cause the coolant to circulate through the circulation flow channel;
    a cooling fan that faces the radiator, and is configured to generate cooling air;
    a first mode controller configured to initiate a first operation mode process when diagnosing an abnormality of the cooling system, the first operation mode process stopping the coolant pump and driving the cooling fan;
    a second mode controller configured to initiate a second operation mode process after completion of the first operation mode process, the second operation mode process stopping the cooling fan and driving the coolant pump; and
    an abnormality diagnosing controller configured to diagnose, on a basis of a temperature of the radiator, the abnormality of the cooling system after the initiation of the second operation mode process, and wherein
    the vehicle includes a start-up switch, and
    the first mode controller initiates the first operation mode process when the start-up switch is turned off by an occupant of the vehicle.

2. The cooling apparatus for the vehicle according to claim 1, wherein the abnormality diagnosing controller diagnoses the abnormality of the cooling system on a basis of a temperature difference between the temperature of the radiator and a temperature of the heat-generating component.

3. The cooling apparatus for the vehicle according to claim 2, wherein the abnormality diagnosing controller diagnoses the cooling system as abnormal when the temperature difference is greater than a diagnosis threshold.

4. The cooling apparatus for the vehicle according to claim 3, wherein the first mode controller initiates the first operation mode process when a temperature difference between the temperature of the radiator and a temperature of outside air or a temperature difference between the temperature of the heat-generating component and the temperature of the outside air is greater than a first threshold.

5. The cooling apparatus for the vehicle according to claim 3, wherein the first mode controller initiates the first operation mode process when the temperature difference between the temperature of the radiator and the temperature of the heat-generating component is less than a second threshold.

6. The cooling apparatus for the vehicle according to claim 3, wherein the second mode controller initiates the second operation mode process when the temperature difference between the temperature of the radiator and the temperature of the heat-generating component is greater than a third threshold.

7. The cooling apparatus for the vehicle according to claim 2, wherein the first mode controller initiates the first operation mode process when a temperature difference between the temperature of the radiator and a temperature of outside air or a temperature difference between the temperature of the heat-generating component and the temperature of the outside air is greater than a first threshold.

8. The cooling apparatus for the vehicle according to claim 2, wherein the first mode controller initiates the first operation mode process when the temperature difference between the temperature of the radiator and the temperature of the heat-generating component is less than a second threshold.

9. The cooling apparatus for the vehicle according to claim 2, wherein the second mode controller initiates the second operation mode process when the temperature difference between the temperature of the radiator and the temperature of the heat-generating component is greater than a third threshold.

10. The cooling apparatus for the vehicle according to claim 1, wherein the first mode controller initiates the first operation mode process when a temperature difference between the temperature of the radiator and a temperature of outside air or a temperature difference between a temperature of the heat-generating component and the temperature of the outside air is greater than a first threshold.

11. The cooling apparatus for the vehicle according to claim 1, wherein the first mode controller initiates the first operation mode process when a temperature difference between the temperature of the radiator and a temperature of the heat-generating component is less than a second threshold.

12. The cooling apparatus for the vehicle according to claim 1, wherein the second mode controller initiates the second operation mode process when a temperature difference between the temperature of the radiator and a temperature of the heat-generating component is greater than a third threshold.

13. The cooling apparatus of claim 1 wherein the first mode controller runs the fan for a predetermined period of time, and the second mode controller runs the cooling pump for a predetermined period of time.

14. The cooling apparatus of claim 1, further comprising both a temperature sensor and a malfunction controller configured to determine whether a malfunction exists in the temperature sensor.

15. A cooling apparatus for a vehicle, the apparatus including a cooling system that cools a heat-generating component, the apparatus comprising:
a radiator that is provided in a circulation flow channel of the cooling system, and configured to cool a coolant that circulates through the circulation flow channel;
a coolant pump that is provided in the circulation flow channel, and configured to cause the coolant to circulate through the circulation flow channel;
a cooling fan that faces the radiator, and is configured to generate cooling air; and
circuitry configured to
initiate a first operation mode process when diagnosing an abnormality of the cooling system, the first operation mode process stopping the coolant pump and driving the cooling fan,
initiate a second operation mode process after completion of the first operation mode process, the second operation mode process stopping the cooling fan and driving the coolant pump, and
diagnose, on a basis of a temperature of the radiator, the abnormality of the cooling system after the initiation of the second operation mode process, and wherein
the vehicle includes a start-up switch, and
the circuitry initiates the first operation mode process when the start-up switch is turned off by an occupant of the vehicle.

16. The cooling apparatus of claim 15 wherein the circuitry is configured such that the first mode controller runs the fan for a predetermined period of time and the second mode controller runs the cooling pump for a predetermined period of time.

17. A cooling apparatus for a vehicle, the apparatus including a cooling system configured to cool a heat-generating component, the apparatus comprising:
a radiator that is provided in a circulation flow channel of the cooling system, and configured to cool a coolant that circulates through the circulation flow channel;
a coolant pump that is provided in the circulation flow channel, and configured to cause the coolant to circulate through the circulation flow channel;
a cooling fan that faces the radiator, and is configured to generate cooling air;
a first mode controller configured to initiate a first operation mode process which represents an initial stage in enabling a diagnosing of an abnormality of the cooling system, the first operation mode process stopping the coolant pump and driving the cooling fan;
a second mode controller configured to initiate a second operation mode process after completion of the first operation mode process, the second operation mode process representing, relative to the initial stage, a subsequent stage in enabling the diagnosing of an abnormality of the cooling system, the second operation mode process stopping the cooling fan and driving the coolant pump; and
an abnormality diagnosing controller configured to diagnose, on a basis of characteristics generated by each of the first mode controller and the second mode controller, the abnormality of the cooling system, and wherein
the vehicle includes a start-up switch, and
the first mode controller initiates the first operation mode process when the start-up switch is turned off by an occupant of the vehicle.

18. The cooling apparatus of claim 17, wherein the first mode controller runs the fan for a predetermined period of time, and the second mode controller runs the cooling pump for a predetermined period of time.

19. The cooling apparatus of claim 17, wherein the circuitry is configured to require, before implementation of the first mode controller operation, that a temperature differential between a temperature of the heat-generating component and outside air is above a predetermined first temperature value and that a temperature difference between the heat-generating component and the radiator is below a second temperature value.

20. The cooling apparatus of claim 19, wherein the circuitry is further configured to require, before implementation of the second mode controller operation, that a temperature differential between the heat-generating component and the radiator is above a predetermined third temperature value.

* * * * *